US012566685B1

(12) United States Patent
Ghosh et al.

(10) Patent No.: US 12,566,685 B1
(45) Date of Patent: Mar. 3, 2026

(54) PROCESSOR-BASED SYSTEM SUPPORTING IN-FIELD TESTING USING EXTERNAL DYNAMIC RANDOM ACCESS MEMORY (DRAM) FOR STORING AND ACCESSING TEST SCAN DATA

(71) Applicant: Microsoft Technology Licensing, LLC, Redmond, WA (US)

(72) Inventors: Pradipta K. Ghosh, Palo Alto, CA (US); Sandesh Jayarama Putturaya, Portland, OR (US); Suresh S. Duthiraru, Portland, OR (US); Christopher Wesneski, The Colony, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/798,321

(22) Filed: Aug. 8, 2024

(51) Int. Cl.
| | |
|---|---|
| *G06F 11/27* | (2006.01) |
| *G06F 11/07* | (2006.01) |
| *G06F 11/22* | (2006.01) |

(52) U.S. Cl.
CPC .......... *G06F 11/27* (2013.01); *G06F 11/0766* (2013.01); *G06F 11/0787* (2013.01); *G06F 11/2268* (2013.01)

(58) Field of Classification Search
CPC .. G06F 11/27; G06F 11/0766; G06F 11/0787; G06F 11/2268
See application file for complete search history.

(56) References Cited

U.S. PATENT DOCUMENTS

| | | | | |
|---|---|---|---|---|
| 10,169,177 | B1 * | 1/2019 | Shivaray | H03K 19/003 |
| 10,788,532 | B2 * | 9/2020 | Deutsch | G11C 29/44 |
| 2018/0095128 | A1 | 4/2018 | Deutsch | |
| 2021/0312057 | A1 * | 10/2021 | Kloth | G06F 21/575 |
| 2025/0217251 | A1 * | 7/2025 | Tonoyan | G06F 11/263 |
| 2025/0306093 | A1 * | 10/2025 | Patel | G01R 31/2856 |

OTHER PUBLICATIONS

J. Ferraro, "Built-in-test for processor-based modules," in IEEE Instrumentation & Measurement Magazine, vol. 5, No. 3, pp. 39-42, Sep. 2002, (Year: 2002).*
Partial European Search Report Received for Application No. 25191004.8, Jan. 15, 2026, 14 Pages.

* cited by examiner

*Primary Examiner* — Cynthia Britt
(74) *Attorney, Agent, or Firm* — Scott Y. Shigeta; Newport IP, LLC

(57) ABSTRACT

Processor-based system supporting in-field testing using external dynamic random access memory (DRAM) for storing and accessing test scan data. The processor-based system includes a processor that includes one or more central processing units (CPUs) that each have access to resources, such as cache memory, a memory controller to access system memory (e.g., DRAM), interfaces circuits, to perform tasks by executing of program code. The processing-based system includes an internal, built-in testing system that allows the processor-based system to be placed into test mode to perform in-field testing of the processor-based system. To support larger-sized scan data, the processor-based system is configured for the built-in-test system to access test scan data stored in DRAM in the processor-based system in a test mode. In this manner, the DRAM supports storing larger-sized test scan data so that greater in-field test coverage can be performed in the processor-based system.

20 Claims, 6 Drawing Sheets

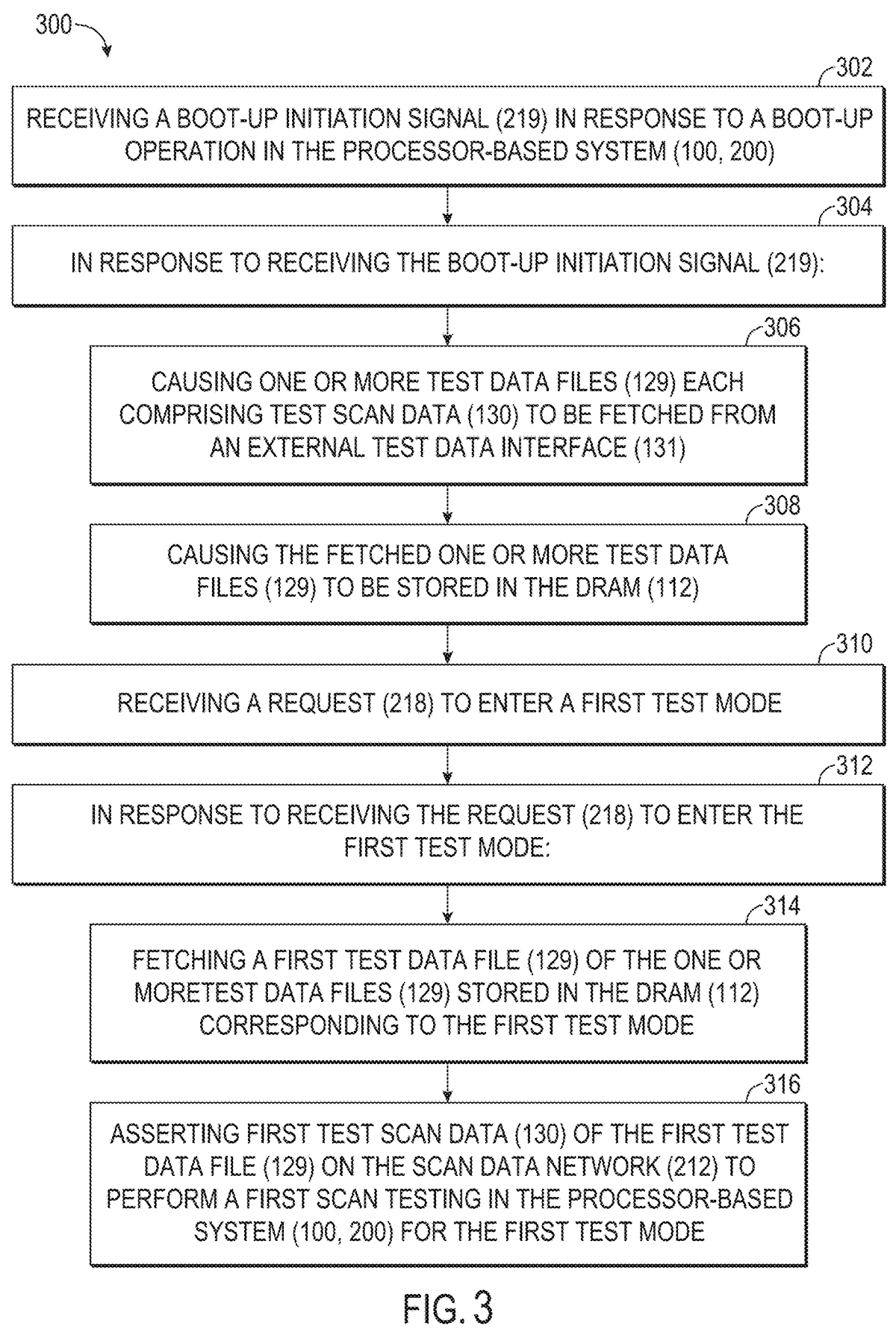

300

302

RECEIVING A BOOT-UP INITIATION SIGNAL (219) IN RESPONSE TO A BOOT-UP OPERATION IN THE PROCESSOR-BASED SYSTEM (100, 200)

304

IN RESPONSE TO RECEIVING THE BOOT-UP INITIATION SIGNAL (219):

306

CAUSING ONE OR MORE TEST DATA FILES (129) EACH COMPRISING TEST SCAN DATA (130) TO BE FETCHED FROM AN EXTERNAL TEST DATA INTERFACE (131)

308

CAUSING THE FETCHED ONE OR MORE TEST DATA FILES (129) TO BE STORED IN THE DRAM (112)

310

RECEIVING A REQUEST (218) TO ENTER A FIRST TEST MODE

312

IN RESPONSE TO RECEIVING THE REQUEST (218) TO ENTER THE FIRST TEST MODE:

314

FETCHING A FIRST TEST DATA FILE (129) OF THE ONE OR MORETEST DATA FILES (129) STORED IN THE DRAM (112) CORRESPONDING TO THE FIRST TEST MODE

316

ASSERTING FIRST TEST SCAN DATA (130) OF THE FIRST TEST DATA FILE (129) ON THE SCAN DATA NETWORK (212) TO PERFORM A FIRST SCAN TESTING IN THE PROCESSOR-BASED SYSTEM (100, 200) FOR THE FIRST TEST MODE

FIG. 3

PROCESSOR-BASED SYSTEM SUPPORTING IN-FIELD TESTING USING EXTERNAL DYNAMIC RANDOM ACCESS MEMORY (DRAM) FOR STORING AND ACCESSING TEST SCAN DATA

FIELD OF THE DISCLOSURE

The technology of the disclosure relates generally to memory structures in a processor-based system configured to store data and to provide read access to data stored therein.

BACKGROUND

Microprocessors, also known as "processors," perform computational tasks for a wide variety of applications. A conventional microprocessor includes a central processing unit (CPU) that includes one or more processor cores, also known as "CPU cores," that execute software/firmware instructions ("instructions"). The software instructions instruct a CPU to perform operations based on data. The CPU performs an operation according to the instructions to generate a result. The processor is included in a processor-based system that also includes supporting hardware and peripheral circuits including memory, interface circuits, and the like. Such processor-based systems conventionally employ a memory system that includes hierarchy lower level to higher level cache memories (e.g., provided as static random access memory (SRAM)), as well as a system memory (e.g., dynamic random access memory (DRAM)) that contains memory storage for the entire physically addressable space of the computing system. A lowest level cache memory in the memory system may be provided in each CPU or CPU core as private cache memory, whereas other higher level cache memories, including a last level cache memory, may be provided in another chip off-chip from the CPU. System memory is typically provided off-chip. If the processor is provided as part of a system-on-a-chip (SoC), the processor as well as the cache memories may be provided in a single chip.

It is important that circuits in a processor-based system, such as a SoC, are free of manufacturing defects that would prevent the processor-based system from properly functioning. In this regard, it is common for manufacturers of SoCs for example to test a processor chip and/or other chips for a processor-based system soon after fabrication for manufacturing defects before the processor is released to an end user/customer. For example, a processor chip may also be designed with the capability of repairing defects depending on the nature of the defect discovered to improve the overall yield. For example, although memory systems in a processor-based system commonly employ parity and other error code correction (ECC) schemes to allow for detection and possibly also correction of bit errors, it is desired that such memory systems be tested for functionality and reliability. If the memory systems are found to be defective beyond repair, the defective memory system or chip that includes the memory system can be discarded. However, some defects can be repaired. For example, an SRAM in a processor-based system may be equipped with redundant memory bit cell rows, such that a regular, non-redundant memory bit cell row in the SRAM may be substituted for a redundant memory bit cell row detected as defective during manufacture testing. In this scenario, an addressing to the defective memory bit cell row is redirected to the substituted SRAM bit cell row in the SRAM. As another example, a processor may have multiple CPU cores, but the processor may be designed such that all of the CPU cores do not have to necessarily function. The processor can be designed to select only the CPU cores detected as not having inoperable defects during manufacturing testing, so that the processor can still function with an acceptable reduced number of functioning CPU cores. In this manner, overall processor yield is improved for defects that can be repaired during manufacturing.

Defects can also occur in processor-based systems during in-field operation. Once a processor-based system is in service in the field, the processor-based system can encounter in-field operational defects that then cause the processor-based system to not properly function. Processor-based systems that are determined to have intolerable defects in the field can be removed from service and repaired. As part of the repair process, in-field testing can be performed on the processor-based system to determine the nature of the defect and to determine if such defect can be repaired or not. In-field testing involves accessing a test access port (TAP) that is specifically designed to allow external access to control test modes, set up functional tests, accesses test data registers, and override internal hardware for testing. The TAP can be coupled to a test control network that is designed according to a standard (e.g., Joint Test Action Group (JTAG) network) to be used to apply test data to various circuits in a test mode to exercise such circuits according to the functional test being performed. In-field testing may be less effective than testing during manufacturing, because only functional testing may be available or possible. The manufacturer as the designer of the processor-based system may have manufacturing tests and supporting test equipment that provide an ability to perform testing on a larger number of circuits to provide larger testing coverage, as opposed to in-field testing that may rely on purely functional tests. The manufacturer may include internal testing circuits in a processor-based design and its chip that is designed to be utilized by the manufacturer specifically to perform manufacturing testing. On the other hand, functional tests may not achieve a high testing coverage in a processor-based system, because functional tests are designed to cause the processor-based system to perform specific functions as part of testing in which only specific circuits may be exercised to perform these specific functions. Thus, it is desired to be able to use more comprehensive in-field manufacturing tests to test processor-based systems to have a greater chance of repair of the processor-based system.

SUMMARY

Exemplary aspects disclosed herein include a processor-based system supporting in-field testing using external dynamic random access memory (DRAM) for storing and accessing test scan data. The processor-based system includes a computing device that includes a processor that has access to computing resources in the processor-based system, such as a memory system including cache memory, a memory controller to access system memory (e.g., DRAM), and interface circuits, to perform computing tasks by executing program code. As an example, the processor-based system may be provided as a system-on-a-chip (SoC) that includes the processor and some of these computing resources on a single integrated circuit (IC) chip. The processor-based system also includes an internal, built-in testing system to perform in-field testing of the processor-based system, such as the processor and the memory system. The built-in testing system can include a test control network (e.g., a Joint Test Action Group (JTAG) network) that can be accessed, such as through an external test interface (i.e., a test access port (TAP)), to receive test control data as part of a test data file to then be asserted on the test control network to setup and control in-field testing in a test mode. The built-in testing system also includes a scan data network that supports streaming of test scan data as part of a test data file that is applied to functional circuits in the processor-based system to exercise these functional circuits as part of functional tests according to the test mode. The built-in testing system can also include a test control circuit that controls the assertion of test control data on the test control network and test scan data on the scan data network to perform in-field testing in a test mode. The ability to perform higher coverage testing of the processor-based system is related to the built-in testing system's capability to store and access test scan data, because different tests require different scan data. Thus, the ability of the built-in testing system to perform a larger number of tests is directly related to the capability to store and access larger-sized test scan data. In this regard, in exemplary aspects, to provide for the processor-based system to be able to support larger-sized scan data for internal testing (e.g., which could be multiple gigabytes (GBs)), the processor-based system is configured for the built-in-testing system to be able to access the DRAM as part of the memory system in the processor-based system to store and access test data files for performing in-field testing. In this manner, the DRAM in the processor-based system can be used by the built-in testing system to support storing and accessing larger-sized test data files so that greater in-field test coverage can be performed in the processor-based system.

In the processor-based system, it may not be desired to access the memory controller that provides the processor access to the DRAM in the processor-based system in case there are defects in the processor-based system. It may be desired to first be able to test the processor-based system with minimal resources available in the processor-based system to reduce complexity to ensure the processor-based system does not have unrecoverable defects before normal memory accesses to DRAM are performed utilizing the memory controller. Thus, in a test mode, the processor-based system may be purposefully designed such that the DRAM is not accessible through the memory controller. Thus, the memory controller would not be accessible to store test data files in the DRAM that could be later retrieved from the DRAM to perform in-field testing of the processor-based system. In this regard, in exemplary aspects, in a test mode, the built-in testing system is further configured to provide access to a data interface circuit (e.g., peripheral component interface express (PCIe) interface circuit) in the processor-based system to receive test data files from an external source that can then be provided to the DRAM for storage outside of the memory controller for later access during a test mode. For example, the processor-based system may be configured to control the data interface circuit as part of a boot-up operation to load in and store test data files in the DRAM. The processor-based system may be configured as part of this boot-up operation to selectively initiate the processor (or a particular CPU core in the processor) to be operational to facilitate the control of the data interface circuit to load in test data files to be stored in the DRAM for later access by the built-in testing system during in-field testing.

In another exemplary aspect, the processor-based system can be configured to partition the DRAM in a test mode to allow a portion(s) of the DRAM to be dedicated to storing test data files. However, other portion(s) of the DRAM can be reserved and still available as normal memory accessible by the processor through the memory controller, such as to facilitate the controlling of the data interface circuit to load in test data files to be stored in DRAM. In a normal, non-test mode of the processor-based system, the DRAM can be repartitioned to be fully available for normal memory operations.

In this regard, in one exemplary aspect, a processor-based system is provided. The processor-based system includes a computing device, comprising a memory system comprising a DRAM and an external test data interface. The computing device is configured to: receive a boot-up initiation signal in response to a boot-up operation in the processor-based system; and in response to receipt of the boot-up initiation signal: cause one or more test data files each comprising test scan data to be fetched from the external test data interface; and cause the fetched one or more test data files to be stored in the DRAM. The processor-based system also includes a built-in testing system comprising a scan data network coupled to the computing device. The built-in testing system is configured to receive a request to enter a first test mode; and in response to receipt of the request to enter the first test mode: fetch a first test data file of the one or more test data files stored in the DRAM corresponding to the first test mode; and assert first test scan data of the first test data file on the scan data network to perform a first scan testing in the computing device for the first test mode.

In another exemplary aspect, a method of performing testing of a processor-based system is provided wherein the processor-based system comprises a computing device, comprising a memory system comprising a DRAM and an external test data interface, and a built-in testing system, comprising a scan data network coupled to the computing device. The method comprises receiving a boot-up initiation signal in response to a boot-up operation in the processor-based system. The method also comprises in response to receiving the boot-up initiation signal: causing one or more test data files each comprising test scan data to be fetched from the external test data interface; and causing the fetched one or more test data files to be stored in the DRAM. The method also comprises receiving a request to enter a first test mode. The method also comprises in response to receiving the request to enter the first test mode: fetching a first test data file of the one or more test data files stored in the DRAM corresponding to the first test mode; and asserting first test scan data of the first test data file on the scan data network to perform a first scan testing in the computing device for the first test mode.

In another exemplary aspect, a non-transitory computer-readable medium having stored thereon computer executable instructions, which when executed by a processor in a processor-based system comprising a computing device, comprising: a memory system comprising a DRAM; and an external test data interface; and a built-in testing system, comprising: a scan data network coupled to the computing device, causes the processor to: receive a boot-up initiation signal in response to a boot-up operation in the processor-based system; and in response to receipt of the boot-up initiation signal: cause one or more test data files each comprising test scan data to be fetched from the external test data interface; and cause the fetched one or more test data files to be stored in the DRAM; receive a request to enter a first test mode; and in response to receipt of the request to enter the first test mode: fetch a first test data file of the one or more test data files stored in the DRAM corresponding to the first test mode; and assert first test scan data of the first test data file on the scan data network to perform a first scan testing in the computing device for the first test mode.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a block diagram of an exemplary processor-based system that includes a computing device that includes an application processor and a memory system that includes cache memory and system dynamic random access memory (DRAM), and wherein the processor-based system also includes an internal built-in-testing system configured to access a test data file in a test mode from the DRAM that was pre-loaded into the DRAM, to support the ability to perform in-field tests using larger test scan data for greater testing coverage;

FIG. 3 is a flowchart illustrating an exemplary process of the built-in testing system in FIGS. 1 and 2 performing in-field testing of the processor-based system based on accessing a test data file from DRAM that was pre-loaded into the DRAM;

Figure 1:
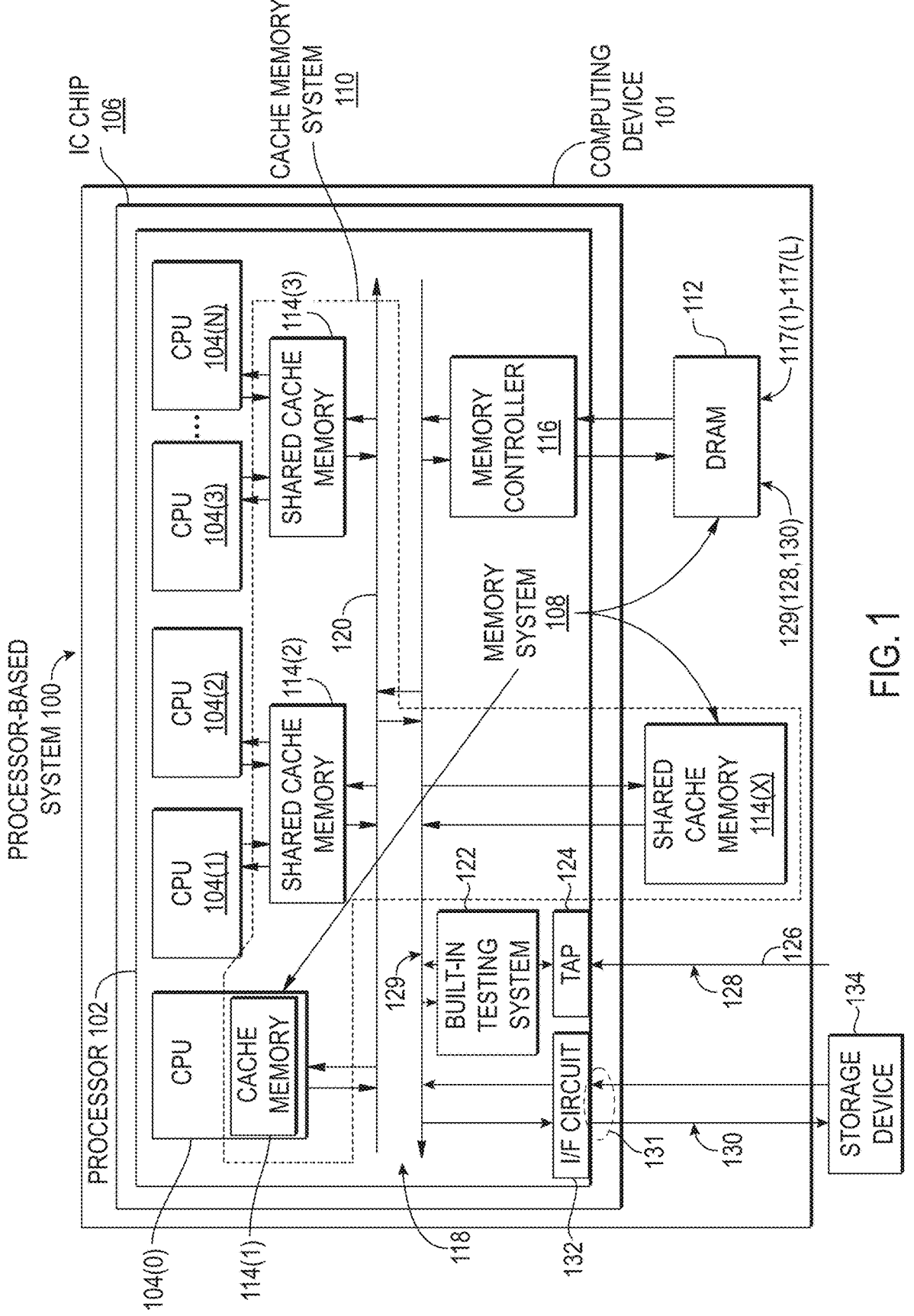
Figure 2:
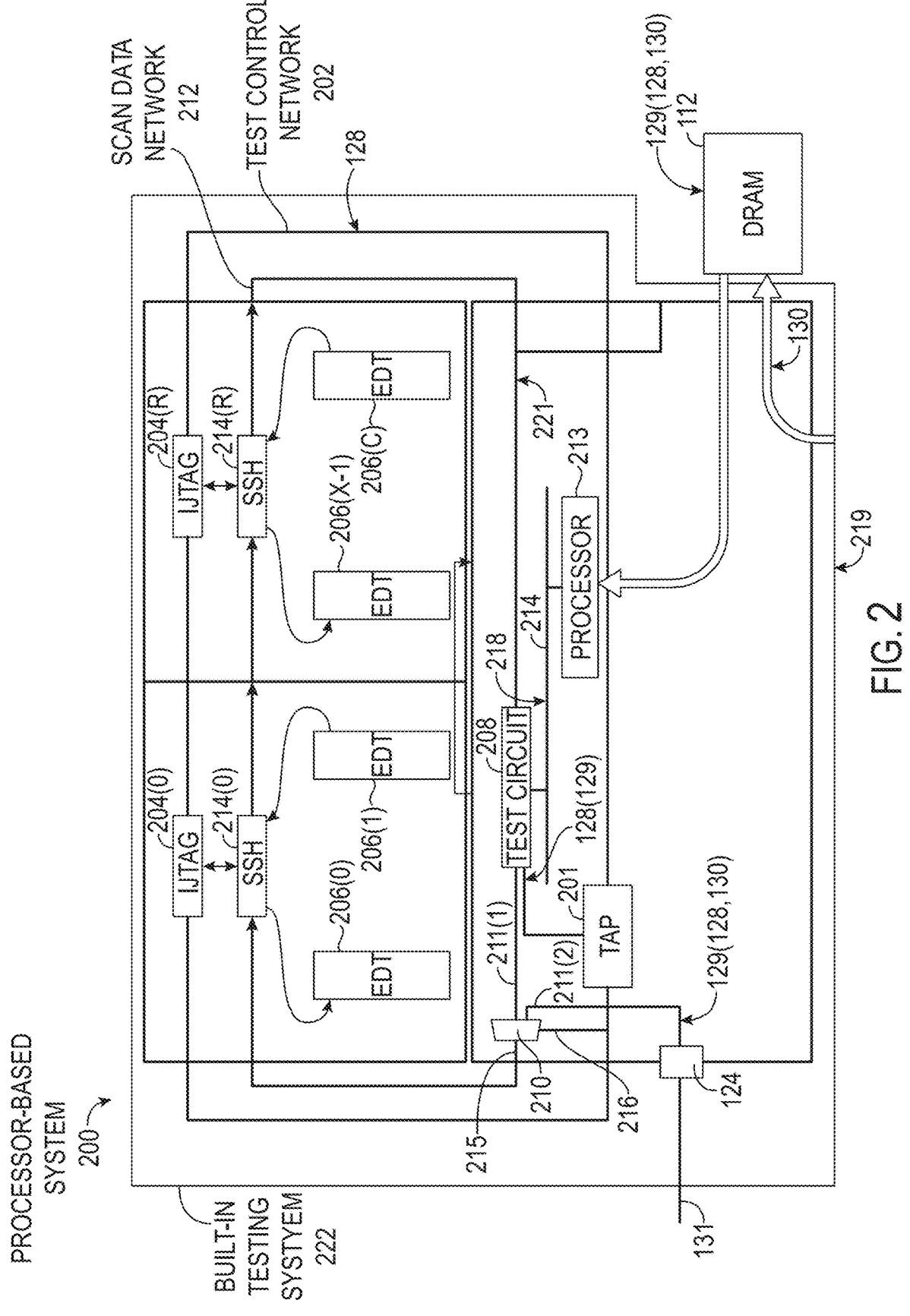
FIG. 2 is a block diagram of an exemplary processor-based system that includes a built-in testing system, wherein the built-in testing system includes a test control circuit that controls loading of test scan data from DRAM in the processor-based system onto a scan data network in a test mode to perform in-field testing of the processor-based system.
Figure 4:
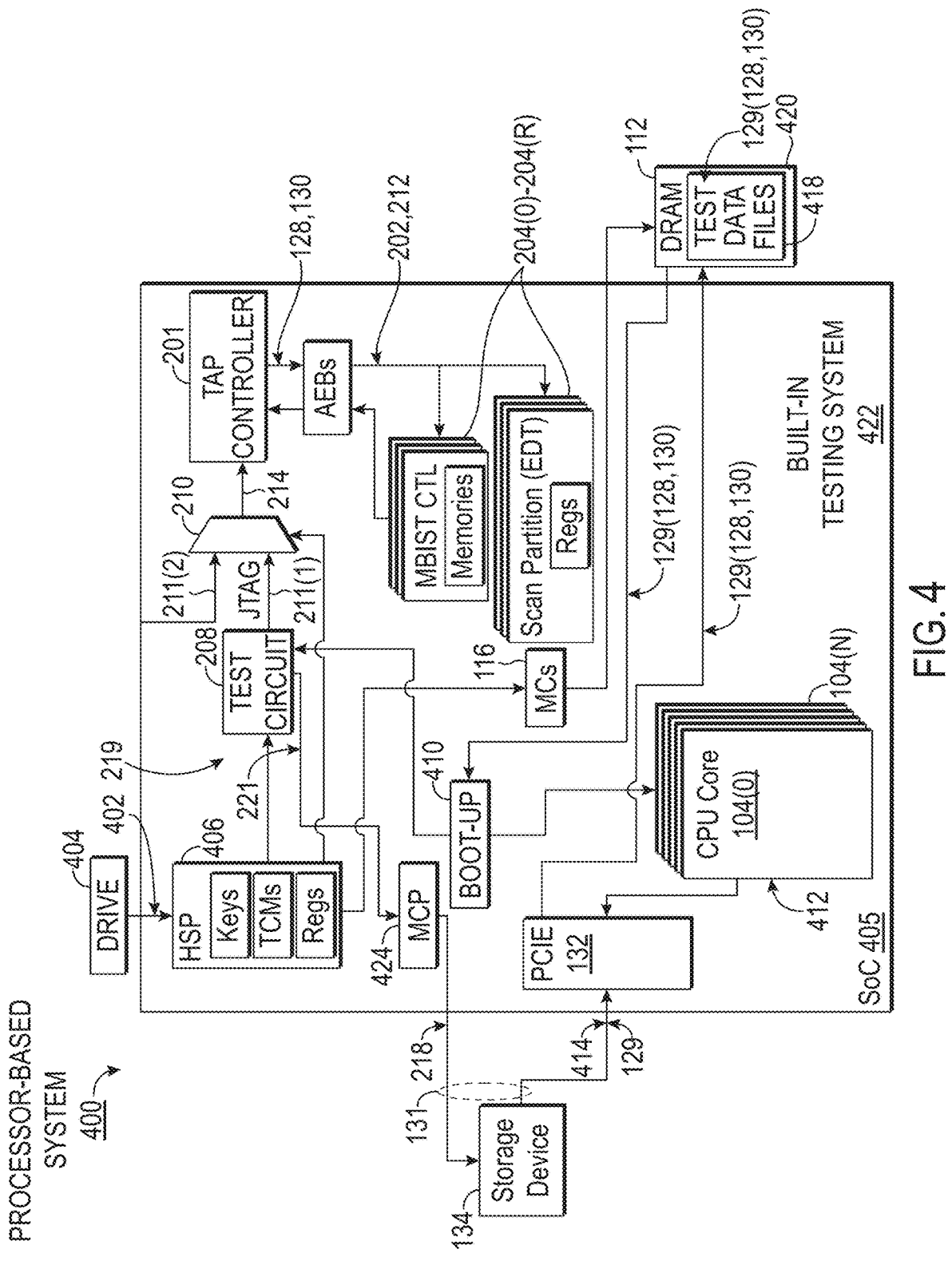
FIG. 4 is a block diagram of another exemplary processor-based system that includes a built-in testing system, wherein the built-in-testing system is configured to perform in-field testing of the processor-based system based on accessing a test data file from DRAM that was pre-loaded into the DRAM.
Figure 6:
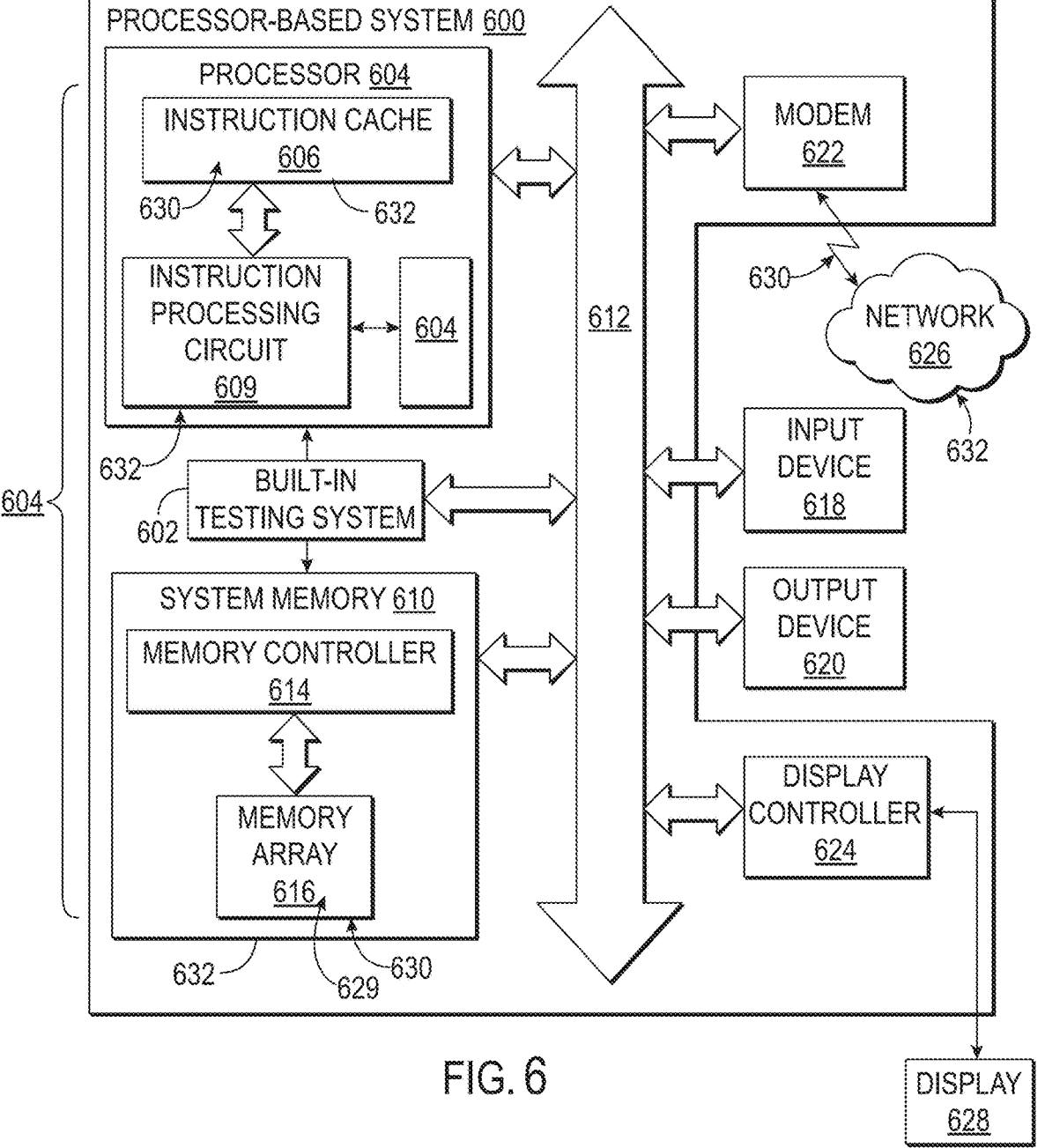

FIG. 6 is a block diagram of an exemplary processor-based system that includes a processor and a built-in testing system including, but not limited to, the built-in testing system in FIGS. 1, 2, and 4, wherein the processor-based system also includes an internal built-in-testing system configured to access a test data file in a test mode from DRAM that was pre-loaded into the DRAM, to support the ability to perform in-field tests using larger test scan data for greater testing coverage.

DETAILED DESCRIPTION

Exemplary aspects disclosed herein include a processor-based system supporting in-field testing using external dynamic random access memory (DRAM) for storing and accessing test scan data. The processor-based system includes a computing device that includes a processor that has access to computing resources in the processor-based system, such as a memory system including cache memory, a memory controller to access system memory (e.g., DRAM), and interface circuits, to perform computing tasks by executing program code. As an example, the processor-based system may be provided as a system-on-a-chip (SoC) that includes the processor and some of these computing resources on a single integrated circuit (IC) chip. The processor-based system also includes an internal, built-in testing system to perform in-field testing of the processor-based system, such as the processor and the memory system. The built-in testing system can include a test control network (e.g., a Joint Test Action Group (JTAG) network) that can be accessed, such as through an external test interface (i.e., a test access port (TAP)), to receive test control data as part of a test data file to then be asserted on the test control network to setup and control in-field testing in a test mode. The built-in testing system also includes a scan data network that supports streaming of test scan data as part of a test data file that is applied to functional circuits in the processor-based system to exercise these functional circuits as part of functional tests according to the test mode. The built-in testing system can also include a test control circuit that controls the assertion of test control data on the test control network and test scan data on the scan data network to perform in-field testing in a test mode. The ability to perform higher coverage testing of the processor-based system is related to the built-in testing system's capability to store and access test scan data, because different tests require different scan data. Thus, the ability of the built-in testing system to perform a larger number of tests is directly related to the capability to store and access larger-sized test scan data. In this regard, in exemplary aspects, to provide for the processor-based system to be able to support larger-sized scan data for internal testing (e.g., which could be multiple gigabytes (GBs)), the processor-based system is configured for the built-in-testing system to be able to access the DRAM as part of the memory system in the processor-based system to store and access test data files for performing in-field testing. In this manner, the DRAM in the processor-based system can be used by the built-in testing system to support storing and accessing larger-sized test data files so that greater in-field test coverage can be performed in the processor-based system.

In this regard, FIG. 1 is a block diagram of an exemplary processor-based system 100 that includes a computing device 101 that includes a processor 102 configured to perform computing tasks based on execution of program code. As discussed below, the processor-based system 100 includes computing resources that can be accessed by the processor 102 as part of carrying out computing tasks. The processor 102 in this example includes one or more respective CPU cores 104(0)-104(N), wherein 'N' is a positive whole number representing the number of CPU cores included in the processor 102. The processor 102 as well as certain other computing resources can be packaged in an integrated circuit (IC) chip 106, such as to provide a system-on-a-chip (SoC). The CPU cores 104(0)-104(N) in the processor 102 are configured to issue memory requests (i.e., data read and data write requests) to a memory system 108 as part of the computing device 101. The memory system 108 includes a cache memory system 110 and a DRAM 112 as a system memory, which in this example is a separate DRAM chip(s) outside the IC 106. The DRAM 112 is a memory that is fully addressable by the physical address (PA) space of the processor-based system 100. The cache memory system 110 in the memory system 108 includes one or more cache memories 114(1)-114(X), where 'X' is a positive whole number representing the number of cache memories included in the processor 102.

With continuing reference to FIG. 1, the processor-based system 100 also includes a memory controller 116 that controls access to memory lines 117(1)-117(L) (i.e., memory locations that are sized of a particular size, such as the size of a cache line in the cache memory system 110) in the DRAM 112 in response to receiving a memory access request 118. For example, a CPU core 104(0)-104(N) as a requesting device may issue a memory access request 118 to read data in response to processing a load instruction. The memory access request 118 includes a target address of the data to be read from memory. Using CPU core 104(0) as an example, if the requested data is not in a private cache memory 114(1) (i.e., a cache miss to cache memory 114(1)) which may be considered a level one (L1) cache memory, the private cache memory 114(1) sends the memory access request 118 over an interconnect bus 120 in this example to a shared cache memory 114(X) shared with all of the CPU cores 104(0)-104(N), which may be a level 3 (L3) cache memory. The requested data in the memory access request 118 is eventually either fulfilled in a cache memory 114(1)-114(X) or the DRAM 112 if not contained in any of the cache memories 114(1)-114(X).

It is important that circuits in the processor-based system 100 are free of manufacturing defects that would prevent the processor-based system 100 from properly functioning. While a manufacturer of the processor-based system 100 may be equipped to perform testing of the processor-based system 100 during manufacturing, it is also desirable to be able to perform testing of the processor-based system 100 in the field as the processor-based system 100 is deployed. This is because even once the processor-based system 100 is in service in the field, the processor-based system 100 can encounter in-field operational defects that then cause the processor-based system 100 to not properly function. In this regard, as discussed in more detail below, the processor-based system 100 includes a built-in testing system 122. The built-in testing system 122 is configured to perform internal, in-field testing of the processor-based system 100, including as the processor-based system 100 is in the field in operation. For example, the built-in testing system 122 can be configured to perform functional testing of the processor 102 and its CPU cores 104(0)-104(N) and the memory system 108. By providing the built-in testing system 122 as an integrated part of the processor-based system 100, including as part of the IC 106, the built-in testing system 122 can be activated to perform internal testing of the processor-based system 100 without the need for external testing equipment. In this manner, if the processor-based system 100 is determined to have intolerable defects in the field, it can be removed from service and repaired.

The built-in testing system 122 can perform functional tests on the processor-based system 100 using test scan data from a test scan file. The test scan data is data that can be applied to various circuits in the processor-based system 100 in a test mode so that such circuits are exercised. The results of applying the test scan data to the tested circuits can then be verified to determine if any errors exist. In this regard, the processor-based system 100 can include a test access port (TAP) 124 to control distribution of data for the built-in testing system 122 when in a test mode to perform functional testing. The processor-based system 100 may include a debug interface 126 that is configured to receive test control data 128 that is provided to the built-in testing system 122 to allow the built-in testing system 122 to control the test mode and how to control the testing of the processor-based system 100, such as through the updating of test registers. For example, the test control data 128 may be compatible with the joint test action group (JTAG) standard. The built-in testing system 122 is configured to apply test scan data 130 to the circuits in the processor-based system 100 to be tested according to the test control data 128. The testing coverage ability of the built-in testing system 122 is related to the amount of test scan data 130 that can be accessed. The larger the amount of test scan data 130, generally the greater test coverage that can be achieved in the processor-based system 100. Further, different functional tests may require different test scan data, and thus to perform a larger number of functional tests in the processor-based system 100, access to a larger amount of test scan data 130 would be required. Thus, because the test scan data 130 can be very large (e.g., multiple gigabytes (GBs)) to provide the desired functional testing of the processor-based system 100, the processor-based system 100 can support the loading of the test scan data 130 over an external test data interface 131 provided by a data interface circuit 132 (e.g., a peripheral component interface express (PCIe) interface circuit from an external source, such as an external storage device 134. The external storage device 134 may be a locally connected device (e.g., a hard drive) or remotely connected over a network to the processor-based system 100. While the external storage device 134 can be accessed to obtain the test scan data 130 for functional testing, accessing the test scan data 130 from the external storage device 134 can be slow, thus substantially increasing the amount of time required to perform in-field testing of the processor-based system 100 in an undesirable manner.

In this regard, as discussed in exemplary aspects later below, the processor-based system 100 can be configured to support in-field testing using the DRAM 112 for storing and accessing the test scan data 130 for the built-in testing system 122 to perform in-field functional tests. As discussed in more detail below, the processor-based system 100 can be configured to load the test scan data 130 into the DRAM 112 before functional testing begins, such as part of a boot-up operation of the processor-based system 100. For example, a special boot-up code can be provided to cause the processor-based system 100 to enter into a special test boot-up mode, where the boot-up code facilitates activating the processor 102 (or a CPU core 104(0)-104(N) therein) to initiate the data interface circuit 132 to be able to load in the test scan data 130 from the external storage device 134. The processor 102 can then facilitate storing the received test scan data 130 into the DRAM 112. As discussed in more detail below, the processor-based system 100 can be configured so that an activated CPU core 104(0)-104(N) in the processor 102 is able to access the DRAM 112 through an alternative data path without having to access the memory controller 116, which may otherwise not be active and accessible to access the DRAM 112 in a test mode. A DRAM 112 is a larger sized memory than the internal cache memories 114(1), 114(2) in the processor-based system 100, and thus the DRAM 112 is capable of storing a larger amount of test scan data 130 In this manner, later after test boot-up operations and during testing of the processor-based system 100, the built-in testing system 122 can access the test scan data 130 from the DRAM 112 so that greater in-field test coverage can be performed in the processor-based system 100 and in a more efficient manner since data can be transferred from the DRAM 112 faster than typically from the external storage device 134.

FIG. 2 is a block diagram of another exemplary built-in testing system 222 in another processor-based system 200 like the processor-based system 100 in FIG. 1 to provide more exemplary detail of how the built-in testing system 222 can utilize DRAM in the processor-based system to access the test scan data to perform testing. The built-in testing system 222 in the processor-based system 200 in FIG. 2 could be included as the built-in testing system 122 in FIG. 1. Common elements between the processor-based system 200 in FIG. 2 and the processor-based system 100 in FIG. 1 are shown with common element numbers.

As shown in FIG. 2, a tap controller 201 that is coupled to the TAP 124, is coupled to a test control network 202 that is configured to receive and distribute test control data 128 as part of a test data file 129 to various test control registers 204(0)-204(R) that can be updated to control how the test scan data 130 (as part of a test data file 129) is applied to circuits 206(0)-206(C) in the processor-based system 200 to be tested. The tap controller 201 is also coupled to a test circuit 208 that is configured to control testing of the processor-based system 200 when in a test mode according to the test control data 128 to be asserted on the test control network 202. The tap controller 201 is also able to control a control circuit 210 (e.g., a multiplexer) that is configured to control the source of the test scan data 130 as either coming from the external test data interface 131 or the test circuit 208. The control circuit 210 has a first tap input 211(1) that is coupled to the test circuit 208, a second tap input 211(2) coupled to the external test data interface 131, a tap output 215 coupled to a scan data network 212, and a tap control input 216 coupled to the control circuit 210. The test scan data 130 can be asserted on the scan data network 212 to be communicated to circuit access nodes 214(0)-214(R) that are coupled to the circuits 206(0)-206(C) to be tested, as controlled by the test control data 128 stored in the respective test control registers 204(0)-204(R).

In this example, the control circuit 210 is also able to access test scan data 130 as part of a test data file(s) 129 from either the external test data interface 131 directly, or from the DRAM 112 in which the test scan data 130 was pre-loaded therein from the external test data interface 131. As shown in FIG. 2, the built-in testing system 222 includes a processor 213 (could be a dedicated processor or a CPU core 104(0)-104(N) in FIG. 1) that is configured to access the test control data 128 and the test scan data 130 as part of a test data file(s) 129 from the DRAM 112 to then assert that test control data 128 and test scan data 130 on the respective test control network 202 and scan data network 212 to the test the circuits 206(1)-206(C). In this example, in response to the test circuit 208 entering a test mode, the test circuit 208 causes the tap controller 201 to assert the test control data 128 on the test control network 202 received from the DRAM 112 as part of a test data file(s) 129. The test circuit 208 also causes the tap controller 201 to control the control circuit 210 to couple the test scan data 130 from the test circuit 208 received from the DRAM 112 onto the scan data network 212. In this manner, the test circuit 208 is able to control the asserting of the test control data 128 and test scan data 130 in the processor-based system 200 to perform functional testing wherein the test control data 128 and test scan data 130 can be obtained from the DRAM 112. Alternatively, if the test circuit 208 desires to test the processor-based system 200 with test scan data 130 directly from the external test data interface 131, the control circuit 210 can instruct the tap controller 201 to control the control circuit 210 to couple the test scan data 130 received directly from the external test data interface 131.

With continuing reference to FIG. 2, the control circuit 210 is also configured to receive test scan results data 221 as a result of the data in the test scan data 130 being applied to the circuits 206(1)-206(C) and generating the test scan results data 221. The test circuit 208 is configured to compare or provide the test scan results data 221 to another computing device (e.g., the processor 102 in FIG. 1) to determine if the tests resulted in errors or not. The test scan results data 221 could also be provided to an external device such as through the data interface circuit 132 in FIG. 1.

FIG. 3 is a flowchart illustrating an exemplary process 300 of the built-in testing system 222 in FIG. 2 performing in-field testing of the processor-based system 100, 200 in FIG. 1 or 2 based on accessing a test data file 129 from DRAM 112 that was pre-loaded into the DRAM 112. The process 300 in FIG. 3 will be discussed in reference to the built-in testing system 222 in FIG. 2 with regard to the processor-based systems 100, 200 in FIGS. 1 and 2.

The process 300 includes receiving a boot-up initiation signal 219 in response to a boot-up operation in the processor-based system 100, 200 (block 302 in FIG. 3). In response to receiving the boot-up initiation signal 219 (block 304 in FIG. 3), the processor-based system 100, 200 causes one or more test data files 129 each comprising the test scan data 130 to be fetched from the external test data interface 131 (block 306 in FIG. 3). Also in response to receiving the boot-up initiation signal 219 (block 304 in FIG. 3), the processor-based system 100, 200 causes the fetched one or more test data files 129 to be stored in the DRAM 112 (block 308 in FIG. 3). Then, the process 300 includes the built-in testing system 222 receiving a request 218 to enter a first test mode (block 310 in FIG. 3). In response to the test circuit 208 receiving the request 218 to enter the first test mode (block 312 in FIG. 3), the test circuit 208 (via the processor 213) fetches a first test data file 129 stored in the DRAM 112 corresponding to the first test mode (block 314 in FIG. 3). The test circuit 208 then controls the assertion of the first test scan data 130 on the scan data network 212 to perform a first scan testing in the processor-based system 100, 200 for the first test mode (block 316 in FIG. 3).

FIG. 4 is a block diagram of another exemplary processor-based system 400 that includes a built-in testing system 422 in a SoC 405 configured to perform in-field testing of the processor-based system 400 based on accessing a test data file from DRAM that was pre-loaded into the DRAM. The built-in testing system 422 in FIG. 4 could be included as the built-in testing system 122 in the processor-based system 100 in FIG. 1 as an example. Common elements between the processor-based systems 100, 200 in FIGS. 1 and 2, and the processor-based system 400 in FIG. 4 are shown with common element numbers.

As shown in FIG. 4, in this example, to put the processor-based system 400 and its built-in testing system 422 in a testing mode, the processor-based system 400 is configured to use a boot program 402 that is configured to boot up the processor-based system 400 to perform in-field testing. For example, when a drive 404 (e.g. flash drive, non-volatile memory device, network drive) is coupled to a processor 406 (which could be the processor 213 in FIG. 2), the processor 406 is configured to load in the boot program 402 on the drive 404 to be executed to boot up the processor-based system 400 in a boot-up mode for testing. A boot-up initiation signal 219 is generated as a result of the boot-up operation that is provided to the test circuit 208, which in turn communicates the boot-up operation in a test mode to a boot-up processor 410 if the boot-up operation in the test mode is authenticated by the processor 406. The processor 406 facilitates handing off the boot-up operation to the boot-up processor 410, which is configured to initiate an application processor 412, which can be one of the CPU cores 104(0)-104(N) to assist in the boot-up operation. In turn, the application processor 412 is configured to control the data interface circuit 132 to initiate a data path lane 414 on the external test data interface 131 to be able to fetch one or more test data files 129 from the external storage device 134 to be stored in the DRAM 112. In this regard, the test data files 129 received by the data interface circuit 132 are communicated to the DRAM 112 to be stored therein, to be later available for use by the built-in testing system 422 to test the processor-based system 400, like described above in FIG. 2 for example. The test circuit 208 then uses the test data files 129 accessed during testing to assert the test control data 128 to the test control registers 204(0)-204(R) on the test control network 202 and the test scan data 130 on the scan data network 212 to perform testing, and like previously described in FIG. 2. The test circuit 208 can receive the results of the testing to then verify whether such tests were successful, and like described above in FIG. 2. In this regard, the test circuit 208 can provide the test scan results data 221 to another processor 424 (which could be the processor 213 in FIG. 2) that can facilitate communicating such test scan results data 221 to the external storage device 134 for off-line analysis.

Note that the DRAM 112 could be partitioned so that the DRAM 112 can store the test data files 129 in a test data file partition 418 therein, but other data partitions 420 may be present to be able to be used for non-test memory operation in case the built-in testing system 422 still needs access to the DRAM 112 to perform part of the testing operations. Also in this example, note that the memory controller 116 is not accessed (e.g. bypassed) to store the test data files 129 in the DRAM 112, because in this boot-up operation, the memory controller 116 along with other components of the processor-based system 400 are not designed to be available to perform functional tests. This is because may not be desired to access the memory controller 116 and other components in the processor-based system in case there are defects in the processor-based system. It may be desired to first be able to test the processor-based system 100 with minimal resources available to reduce complexity to ensure the processor-based system 100 does not have unrecoverable defects before normal memory accesses to DRAM 112 are performed utilizing the memory controller 116 for example. Thus, in a test mode, the processor-based system 100 may be purposefully designed such that the DRAM 112 is not accessible through the memory controller 116. Thus, the memory controller would not be accessible to store test data files in the DRAM that could be later retrieved from the DRAM to perform in-field testing of the processor-based system. For normal operations that do not involve a testing mode, the memory controller 116 can be accessed to access the DRAM 112 for normal memory access operations.

With continuing reference to FIG. 4, in a testing mode, the boot-up processor 410 is configured to retrieve the test data files 129 from the DRAM 112 to provide such to the test circuit 208 to be used to perform in-field testing of the processor-based system 400.

Figure 5:
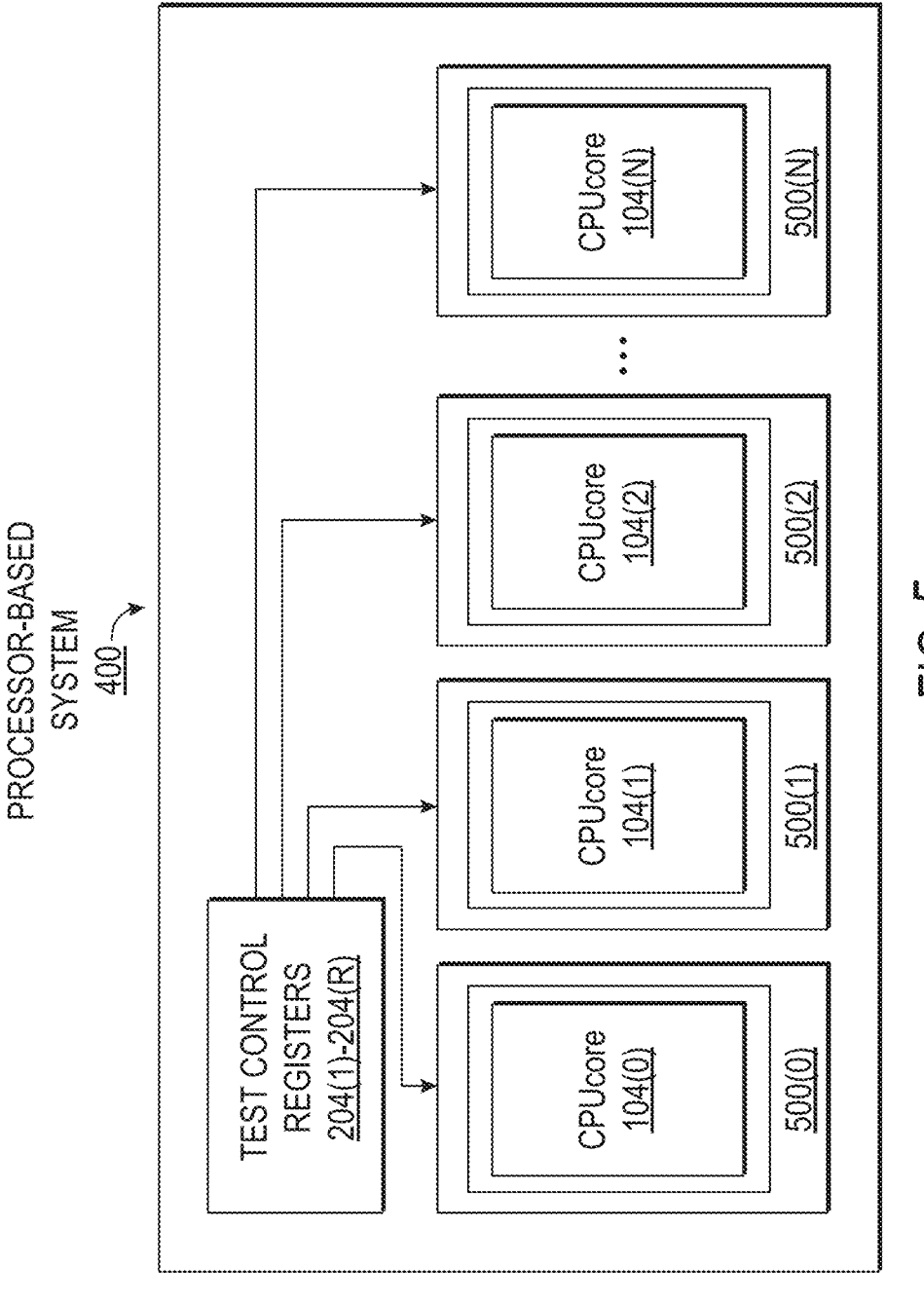
FIG. 5 is a block diagram illustrating functional gating that can be provided for a plurality of central processing unit (CPU) cores of an application processor, including, but not limited to, the application processors in FIGS. 1 and 4, to control the assertion of test scan data to the plurality of CPU cores in a test mode performed by a built-in testing system.

FIG. 5 is a block diagram illustrating a portion of the processor-based system 400 in FIG. 4 that includes functional gating circuits 500(0)-500(N) each coupled to a respective CPU core 104(0)-104(N) to control the assertion of test scan data 130 to the CPU cores 104(0)-104(N) in a test mode performed by the built-in testing system 422. The built-in testing system 422, through use of the test control data 128, can control the function of the functional gating circuits 500(0)-500(N) to control whether test scan data 130 is applied to particular CPU cores 104(0)-104(N) during testing. For example, it may be desired to not allow test scan data 130 to be applied to a particular CPU core 104(0)-104 (N) during testing, such as if the particular CPU core 104(0)-104(N) may be used for performing other boot-up operations, such as controlling the data interface circuit 132 to load in test data files 129 into the DRAM 112 as described above.

FIG. 6 is a block diagram of an exemplary processor-based system 600 that can be the processor-based systems 100, 200, 400 in FIGS. 1, 2, and 4, and that includes a built-in testing system 602, such as the built-in testing systems 122, 222, 422 in FIGS. 1, 2, and 4, configured to access a test data file in a test mode from a DRAM that was pre-loaded into the DRAM, to support the ability to perform an in-field testing of the processor-based system 600, including its processor 604, using larger test scan data for greater testing coverage. The processor-based system 600 includes the processor 604. The processor-based system 600 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based system 600 includes the processor 604. The processor 604 represents one or more general-purpose processing circuits, such as a microprocessor, central processing unit, or the like. The processor 604 is configured to execute processing logic in computer instructions for performing the operations and steps discussed herein.

The processor 604 also includes an instruction cache 606 for temporary, fast access memory storage of instructions and an instruction processing circuit 608. Fetched or prefetched instructions from a memory, such as from a system memory 610 over a system bus 612, are stored in the instruction cache 606. The instruction processing circuit 608 is configured to process instructions fetched into the instruction cache 606 and process the instructions for execution. The instruction processing circuit 608 is configured to insert the fetched instructions into one or more instruction pipelines that are then processed to execution.

The processor 604 and the system memory 610 are coupled to the system bus 612 and can intercouple peripheral devices included in the processor-based system 600. The system memory 610 can be or include a DRAM that is configured to store test data files 629 for use by the built-in testing system 602 to test the processor-based system 600. As is well known, the processor 604 communicates with these other devices by exchanging address, control, and data information over the system bus 612. For example, the processor 604 can communicate bus transaction requests to a memory controller 614 in the system memory 610 as an example of a slave device. Although not illustrated in FIG. 6, multiple system buses 612 could be provided, wherein each system bus constitutes a different fabric. In this example, the memory controller 614 is configured to provide memory read and/or write requests to a memory array 616 in the system memory 610. The memory array 616 is comprised of an array of storage bit cells for storing data. The system memory 610 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 612. As illustrated in FIG. 6, these devices can include the system memory 610, one or more input device(s) 618, one or more output device(s) 620, a modem 622, and one or more display controllers 624, as examples. The input device(s) 618 can include any type of input device, including, but not limited to, input keys, switches, voice processors, etc. The output device(s) 620 can include any type of output device, including, but not limited to, audio, video, other visual indicators, etc. The modem 622 can be any device configured to allow exchange of data to and from a network 626. The network 626 can be any type of network, including, but not limited to, a wired or wireless network, a private or public network, a local area network (LAN), a wireless local area network (WLAN), a wide area network (WAN), a BLUETOOTH™ network, and the Internet. The modem 622 can be configured to support any type of communications protocol desired. The processor 604 may also be configured to access the display controller(s) 624 over the system bus 612 to control information sent to one or more displays 628. The display(s) 628 can include any type of display, including, but not limited to, a cathode ray tube (CRT), a liquid crystal display (LCD), a plasma display, etc.

The processor-based system 600 in FIG. 6 may include a set of instructions 630 that may be used to provide the functionality, including to control the operation of the built-in testing system 602 to perform testing of the processor-based system 600 and the processor 604. The instructions 630 may be stored in the system memory 610, processor 604, and/or instruction cache 606 as examples of non-transitory computer-readable medium 632. The instructions 630 may also reside, completely or at least partially, within the system memory 610 and/or within the processor 604 during their execution. The instructions 630 may further be transmitted or received over the network 626 via the modem 622, such that the network 626 includes the non-transitory computer-readable medium 632.

While the non-transitory computer-readable medium 632 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory (RAM), a magnetic disk storage medium, an optical storage medium, flash memory devices, etc.) and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories, registers, or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium, and executed by a processor or other processing device, or combinations of both. The components of the processors and systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be referenced throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A processor-based system, comprising:
   a computing device, comprising:
      a memory system comprising a dynamic random access memory (DRAM); and
      an external test data interface;
      the computing device configured to:
         receive a boot-up initiation signal in response to a boot-up operation in the processor-based system; and
         in response to receipt of the boot-up initiation signal:
            cause one or more test data files each comprising test scan data to be fetched from the external test data interface; and
            cause the fetched one or more test data files to be stored in the DRAM;
   a built-in testing system, comprising:
      a scan data network coupled to the computing device;

the built-in testing system configured to:
         receive a request to enter a first test mode; and
         in response to receipt of the request to enter the first test mode:
            fetch a first test data file of the one or more test data files stored in the DRAM corresponding to the first test mode; and
            assert first test scan data of the first test data file on the scan data network to perform a first scan testing in the computing device for the first test mode.

2. The processor-based system of claim 1, wherein the computing device further comprises:
   an application processor; and
   a data interface circuit coupled to the external test data interface;
   the computing device, in response to receipt of the boot-up initiation signal, configured to:
      cause the one or more test data files to be fetched from the external test data interface by the application processor being configured to:
         initialize a data path lane in the data interface circuit; and
         cause the data interface circuit to fetch the one or more test data files over the external test data interface; and
      cause the fetched one or more test data files to be stored in the DRAM by the data interface circuit being configured to:
         store the fetched one or more test data files to be stored in the DRAM.

3. The processor-based system of claim 2, wherein the data interface circuit comprises a peripheral component interconnect express (PCIe) interface circuit configured to fetch the one or more test data files over the external test data interface according to a PCIe interface standard.

4. The processor-based system of claim 2, wherein the computing device further comprises a boot-up processor;
   the boot-up processor configured to, in response to receipt of the boot-up initiation signal:
      initiate the application processor; and
   in response to initiation of the application processor, the application processor configured to:
      initialize the data path lane in the data interface circuit; and
      cause the data interface circuit to fetch the one or more test data files over the external test data interface.

5. The processor-based system of claim 2, wherein, in response to receipt of the boot-up initiation signal, the computing device is further configured to:
   create a test data file partition in the DRAM; and
   cause the fetched one or more test data files to be stored in the test data file partition in the DRAM.

6. The processor-based system of claim 5, wherein the computing device further comprises:
   a memory controller coupled to the DRAM,
      the memory controller configured to access a memory line in the DRAM in response to receiving a memory access request corresponding to the memory line;
   the application processor further configured to, in response to receipt of the boot-up initiation signal:
      communicate a first memory access request to the memory controller to access a first memory line in the DRAM outside the test data file partition.

7. The processor-based system of claim 6, wherein the data interface circuit is configured to bypass the memory controller to store the fetched one or more test data files to be stored in the DRAM.

8. The processor-based system of claim 2, wherein:

the application processor comprises a plurality of central processing unit (CPU) cores;

the computing device further comprises a plurality of functional gating circuits each coupled to a designated CPU core of the plurality of CPU cores and each configured to control whether the first test scan data is applied to its designated CPU core; and the built-in testing system is further configured to:

control the plurality of functional gating circuits to control whether the first test scan data is applied to the designated CPU core to each of the plurality of functional gating circuits.

9. The processor-based system of claim 2, comprising a system-on-a-chip (SoC) comprising the application processor and the built-in testing system.

10. The processor-based system of claim 1, wherein:

each of the one or more test data files further comprises a test control data;

the built-in testing system further comprises a test control network coupled to the computing device; and the computing device is further configured to, in response to receipt of the request to enter the first test mode:

assert a first test control data of the first test data file on the test control network; and in response to assertion of the first test control data, assert the first test scan data of the first test data file on the scan data network to perform the first scan testing in the computing device for the first test mode.

11. The processor-based system of claim 10, wherein the computing device is further configured to, in response to receipt of the request to enter the first test mode:

store the first test control data on the test control network in one or more test control registers; and assert the first test scan data of the first test data file on the scan data network to perform the first scan testing in the computing device according to the test control data stored in the one or more test control registers.

12. The processor-based system of claim 11, wherein the built-in testing system further comprises:

a test circuit configured to:

receive the request to enter the first test mode; and in response to receipt of the request to enter the first test mode:

assert the first test scan data of the first test data file on the scan data network to perform the first scan testing in the computing device for the first test mode;

a control circuit comprising a first tap input coupled to the test circuit, a second tap input coupled to the external test data interface, a tap output coupled to the scan data network, and a tap control input; and a tap controller configured to be selectively controlled by the test circuit to:

couple the first tap input to the tap output to provide the first test scan data from the test circuit to the scan data network; and couple the external test data interface to the scan data network in on the tap control input to provide the first test scan data from the external test data interface.

13. The processor-based system of claim 1, wherein:

the built-in testing system is further configured to:

receive first test scan results data on the scan data network in response to assertion of the first test scan data on the scan data network to perform the first scan testing in the computing device; and provide the first test scan results data to the computing device; and the computing device configured to store the first test scan results data in a memory outside the computing device.

14. A method of performing testing of a processor-based system, the processor-based system comprising:

a computing device, comprising:

a memory system comprising a dynamic random access memory (DRAM); and an external test data interface; and a built-in testing system, comprising:

a scan data network coupled to the computing device;

the method comprising:

receiving a boot-up initiation signal in response to a boot-up operation in the processor-based system; and in response to receiving the boot-up initiation signal:

causing one or more test data files each comprising test scan data to be fetched from the external test data interface; and causing the fetched one or more test data files to be stored in the DRAM;

receiving a request to enter a first test mode; and in response to receiving the request to enter the first test mode:

fetching a first test data file of the one or more test data files stored in the DRAM corresponding to the first test mode; and asserting first test scan data of the first test data file on the scan data network to perform a first scan testing in the computing device for the first test mode.

15. The method of claim 14, wherein the computing device further comprises:

an application processor; and a data interface circuit coupled to the external test data interface; and wherein, in response to receiving the boot-up initiation signal, the method further comprises:

causing the one or more test data files to be fetched from the external test data interface by the application processor by:

initializing a data path lane in the data interface circuit; and causing the data interface circuit to fetch the one or more test data files over the external test data interface; and causing the fetched one or more test data files to be stored in the DRAM by the data interface circuit by:

storing the fetched one or more test data files to be stored in the DRAM.

16. The method of claim 15, wherein the computing device further comprises a boot-up processor; and in response to receiving the boot-up initiation signal, further comprising the boot-up processor initiating the application processor; and in response to initiating the application processor, further comprising the application processor:

initializing the data path lane in the data interface circuit; and causing the data interface circuit to fetch the one or more test data files over the external test data interface.

17. The method of claim 15, further comprising, in response to receiving the boot-up initiation signal:
  creating a test data file partition in the DRAM; and
  causing the fetched one or more test data files to be stored in the test data file partition in the DRAM.

18. The method of claim 15, wherein:
  each of the one or more test data files further comprises a test control data;
  the built-in testing system further comprises a test control network coupled to the computing device; and
  in response to receiving the request to enter the first test mode, the method further comprises:
    asserting a first test control data of the first test data file on the test control network; and
    in response to asserting the first test control data:
      asserting the first test scan data of the first test data file on the scan data network to perform the first scan testing in the computing device for the first test mode.

19. The method of claim 18, further comprising, in response to receiving the request to enter the first test mode:
  storing the first test control data on the test control network in one or more test control registers; and
  asserting the first test scan data of the first test data file on the scan data network to perform the first scan testing in the computing device according to the test control data stored in the one or more test control registers.

20. A non-transitory computer-readable medium having stored thereon computer executable instructions, which when executed by a processor in a processor-based system comprising a computing device, comprising: a memory system comprising a dynamic random access memory (DRAM); and an external test data interface; and a built-in testing system, comprising: a scan data network coupled to the computing device,
  causes the processor to:
    receive a boot-up initiation signal in response to a boot-up operation in the processor-based system; and
    in response to receipt of the boot-up initiation signal:
      cause one or more test data files each comprising test scan data to be fetched from the external test data interface; and
      cause the fetched one or more test data files to be stored in the DRAM;
    receive a request to enter a first test mode; and
    in response to receipt of the request to enter the first test mode:
      fetch a first test data file of the one or more test data files stored in the DRAM corresponding to the first test mode; and
      assert first test scan data of the first test data file on the scan data network to perform a first scan testing in the computing device for the first test mode.

* * * * *